United States Patent
Cui et al.

(10) Patent No.: US 12,536,690 B2
(45) Date of Patent: Jan. 27, 2026

(54) LINE POSITION ESTIMATION DEVICE, METHOD, AND PROGRAM

(71) Applicant: NEC Corporation, Tokyo (JP)

(72) Inventors: Wenjing Cui, Tokyo (JP); Yoshihiro Mishima, Tokyo (JP)

(73) Assignee: NEC CORPORATION, Tokyo (JP)

(*) Notice: Subject to any disclaimer, the term of this patent is extended or adjusted under 35 U.S.C. 154(b) by 195 days.

(21) Appl. No.: 18/039,625

(22) PCT Filed: Dec. 3, 2020

(86) PCT No.: PCT/JP2020/045000
§ 371 (c)(1),
(2) Date: May 31, 2023

(87) PCT Pub. No.: WO2022/118422
PCT Pub. Date: Jun. 9, 2022

(65) Prior Publication Data
US 2024/0095946 A1   Mar. 21, 2024

(51) Int. Cl.
*G06T 7/73* (2017.01)
*G06V 20/56* (2022.01)

(52) U.S. Cl.
CPC .............. *G06T 7/73* (2017.01); *G06V 20/588* (2022.01); *G06T 2207/30256* (2013.01)

(58) Field of Classification Search
CPC ............ G06T 7/73; G06T 2207/30256; G06V 20/588
USPC ....................................................... 701/300
See application file for complete search history.

(56) References Cited

U.S. PATENT DOCUMENTS

| | | | |
|---|---|---|---|
| 9,886,649 B2* | 2/2018 | Kakegawa | B60T 7/22 |
| 9,914,446 B2* | 3/2018 | Kokido | B60W 30/10 |
| 10,099,689 B2* | 10/2018 | Wada | B60W 30/12 |
| 10,300,854 B2* | 5/2019 | Lee | G06T 7/33 |
| 11,803,026 B2* | 10/2023 | Song | G02B 7/02 |
| 11,900,627 B2* | 2/2024 | Westmacott | G06V 20/56 |
| 2010/0284569 A1 | 11/2010 | Sakurai | |

(Continued)

FOREIGN PATENT DOCUMENTS

| | | |
|---|---|---|
| JP | 2002-175534 A | 6/2002 |
| JP | 2009-169510 A | 7/2009 |

(Continued)

OTHER PUBLICATIONS

English Translation—International Application No. PCT/JP2020/045000, Jun. 21, 2002.*

(Continued)

*Primary Examiner* — Andrew Joseph Rudy
(74) *Attorney, Agent, or Firm* — Sughrue Mion, PLLC

(57) ABSTRACT

The area recognition image generation means 81 generates an area recognition image including a road area from an area recognition image which is a captured image of the front of a vehicle. The overhead view image generation means 82 generates a first overhead view image obtained by converting the generated area recognition image into an overhead view image. The line position estimation means 83 estimates a position of line marked on a road surface from the road area identified by the generated first overhead view image, based on a principle of lane boundaries.

13 Claims, 7 Drawing Sheets

(56) References Cited

U.S. PATENT DOCUMENTS

| | | | | |
|---|---|---|---|---|
| 2014/0218509 A1* | 8/2014 | Kondo | ............... | G01C 21/3658 348/118 |
| 2016/0314359 A1* | 10/2016 | Sakamoto | ............... | B60K 35/81 |
| 2019/0095722 A1 | 3/2019 | Kang et al. | | |
| 2022/0348217 A1* | 11/2022 | Jeong | ................... | B60W 40/04 |

FOREIGN PATENT DOCUMENTS

| | | |
|---|---|---|
| JP | 2011-186722 A | 9/2011 |
| JP | 2013-122739 A | 6/2013 |
| JP | 2014-104853 A | 6/2014 |
| JP | 2016-004287 A | 1/2016 |
| JP | 2017-016172 A | 1/2017 |
| JP | 2018-127073 A | 8/2018 |
| JP | 2019-139762 A | 8/2019 |
| JP | 2020-075607 A | 5/2020 |
| JP | 2020-086956 A | 6/2020 |
| WO | 2017/002650 A1 | 1/2017 |
| WO | 2017/163367 A1 | 9/2017 |
| WO | 2018/030271 A1 | 2/2018 |

OTHER PUBLICATIONS

International Search Report for PCT Application No. PCT/JP2020/045000, mailed on Jan. 12, 2021.

Liu J. et al., "Lane Detection Based on Straight Line Model and K-Means Clustering", 2018 IEEE 7th Data Driven Control and Leaning Systems Conference. 2018 pp. 527-532.

Extended European Search Report for EP Application No. EP20964275.0, dated on Nov. 3, 2023.

Hao Li et al., "Robust real-time lane detection based on lane mark segment features and general a priori knowledge", Robotics and Biomimetics (ROBIO), 2011 IEEE International Conference on, IEEE, Dec. 7, 2011 (Dec. 7, 2011), XP032165885, pp. 812-817.

Mccall JC et al., "An integrated, robust approach to lane marking detection and lane tracking", Intelligent Vehicles Symposium, 2004 IEEE Parma, Italy Jun. 14-17, 2004, Piscataway, NJ, USA, IEEE, Jun. 14, 2004 (Jun. 14, 2004), XP010727703, pp. 533-537.

Sandipann P. Narote et al., "A review of recent advances in lane detection and departure warning system", Pattern Recognition 73(2018), pp. 216-pp. 234.

JP Office Action for JP Application No. 2022-566570, mailed on Apr. 16, 2024 with English Translation.

JP Official Communication for Japanese Patent Application No. 2022-566570, mailed on Aug. 13, 2024 with English Translation.

* cited by examiner

LINE POSITION ESTIMATION DEVICE, METHOD, AND PROGRAM

This application is a National Stage Entry of PCT/JP2020/045000 filed on Dec. 3, 2020, the contents of all of which are incorporated herein by reference, in their entirety.

TECHNICAL FIELD

This invention relates to a line position estimation device, a line position estimation method, and a line position estimation program for estimating the position of a line marked on a road surface.

BACKGROUND ART

In recent years, in order to realize automated driving, etc., it has become necessary to properly grasp the position of a vehicle on the road. In order to properly grasp the position of a vehicle, it is necessary to properly recognize lines indicating "center lines", "lane boundaries", "side strips", and the like.

Patent Literature 1 describes an in-vehicle control device for recognizing white lines around a vehicle. The in-vehicle control device described in Patent Literature 1 uses a camera to capture images of the shooting range in front of the vehicle and each side of the vehicle to generate an overhead view image (top view image), and recognizes parking frames around the vehicle and white lines in the driving lane based on the generated overhead view image.

CITATION LIST

Patent Literature

PTL 1: Japanese Patent Application Laid-Open No. 2014-104853

SUMMARY OF INVENTION

Technical Problem

On the other hand, there is a problem that the distant lines are often unclear in images taken in front of the vehicle while it is running, because images taken in the distance are often blurred. Another problem is that if there is another vehicle traveling in front of the vehicle, the front line is hidden by the another vehicle.

It is possible to recognize white lines around vehicles with a certain accuracy by using the method described in Patent Literature 1. However, the method described in Patent Literature 1 does not take into account the problem that arise when recognizing distant lines as described above.

For example, in the method for recognizing white lines based on an overhead view image described in Patent Literature 1, edge points whose luminance change is greater than a predetermined threshold when searched in the horizontal direction in the overhead view image are extracted, and white lines are recognized based on the extracted edge points. However, this method also has a problem that the recognition accuracy is reduced when the white line to be recognized is bluffed.

It is therefore an object of the present invention to provide a line position estimation device, a line position estimation method, and a line position estimation program that can estimate the position of a line marked on a road surface.

Solution to Problem

The line position estimation device according to the present invention includes area recognition image generation means for generating an area recognition image including a road area from a vehicle front image which is a captured image of the front of a vehicle, overhead view image generation means for generating a first overhead view image obtained by converting the generated area recognition image into an overhead view image, and line position estimation means for estimating a position of line marked on a road surface from the road area identified by the generated first overhead view image, based on a principle of lane boundaries.

The line position estimation method according to the present invention includes generating an area recognition image including a road area from a vehicle front image which is a captured image of the front of a vehicle, generating a first overhead view image obtained by converting the generated area recognition image into an overhead view image, and estimating a position of line marked on a road surface from the road area identified by the generated first overhead view image, based on a principle of lane boundaries.

The line position estimation program according to the present invention causes a computer to execute an area recognition image generation process of generating an area recognition image including a road area from a vehicle front image which is a captured image of the front of a vehicle, an overhead view image generation process of generating a first overhead view image obtained by converting the generated area recognition image into an overhead view image, and a line position estimation process of estimating a position of line marked on a road surface from the road area identified by the generated first overhead view image, based on a principle of lane boundaries.

Advantageous Effects of Invention

According to the invention, the position of a line marked on the road surface can be estimated.

DESCRIPTION OF EMBODIMENTS

Hereinafter, exemplary embodiments of the present invention will be explained with reference to the drawings. Lines in the following description refer to various types of lines that mark the boundaries between vehicles, marked on the road surface, such as "center lines", "lane boundaries", "side strips", and the like. Although there are solid white lines, dashed white lines, solid yellow lines, etc., lines are referred to as white lines in the following description for the sake of simplicity.

Figure 1:
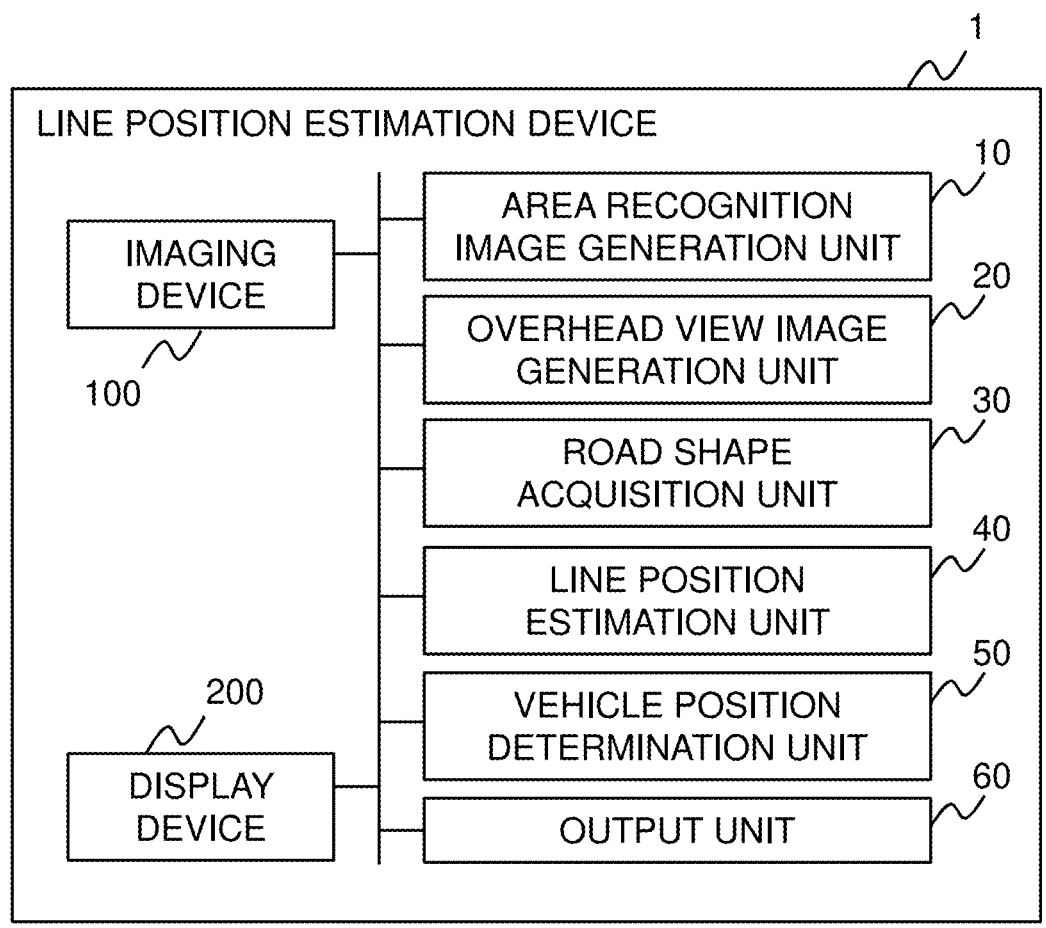
FIG. 1 It depicts a block diagram showing a configuration example of an exemplary embodiment of a line position estimation device according to the present invention.

FIG. 1 is a block diagram showing a configuration example of an exemplary embodiment of a line position estimation device according to the present invention. The line position estimation device 1 in this exemplary embodiment includes an imaging device 100, an area recognition image generation unit 10, an overhead view image generation unit 20, a road shape acquisition unit 30, a line position estimation unit 40, a vehicle position determination unit 50, an output unit 60, and a display device 200.

The imaging device 100 is a device that captures images of the front of a vehicle, i.e., an in-vehicle camera. In the following description, a captured image of the front of the vehicle is referred to as a vehicle front image. The imaging device 100 is installed in advance so that it can capture images in front of the vehicle. The imaging device 100 may capture the image while the vehicle is running, or may capture the image while the vehicle is stopped.

The display device 200 is a device that displays the images captured by the imaging device 100. The display device 200 may also display the positions of the lines estimated by the line position estimation unit 40, described later. The display device 200 is realized by a display, for example.

The area recognition image generation unit 10 generates an image in which the meaning indicated by each area in the image is recognized (hereinafter referred to as an area recognition image) from the vehicle front image captured by the imaging device 100. In particular, in this exemplary embodiment, the area recognition image generation unit 10 generates an area recognition image that includes an area recognized as a road (hereinafter referred to as a road area) from the vehicle front image.

The method by which the area recognition image generation unit 10 generates the area recognition image is arbitrary. For example, the area recognition image generation unit 10 may generate the area recognition image by identifying the meaning of each image area through image segmentation. When the imaging device 100 has a depth sensor, the area recognition image generation unit 10 may generate the area recognition image using a detection result by the depth sensor, because it is possible to measure the distance to the object in the vehicle front image. The area recognition image may be an image in which meanings are labeled by the pixel unit in the image, for example.

Figure 2:
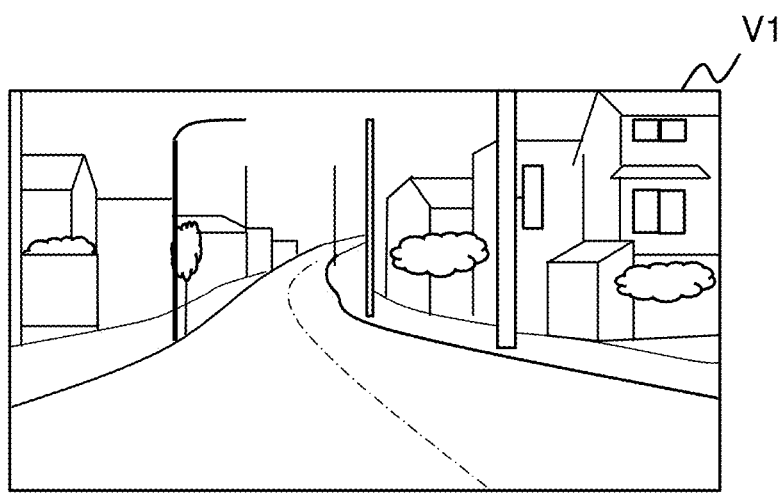
FIG. 2 It depicts an explanatory diagram showing an example of an area recognition image.
Figure 2:
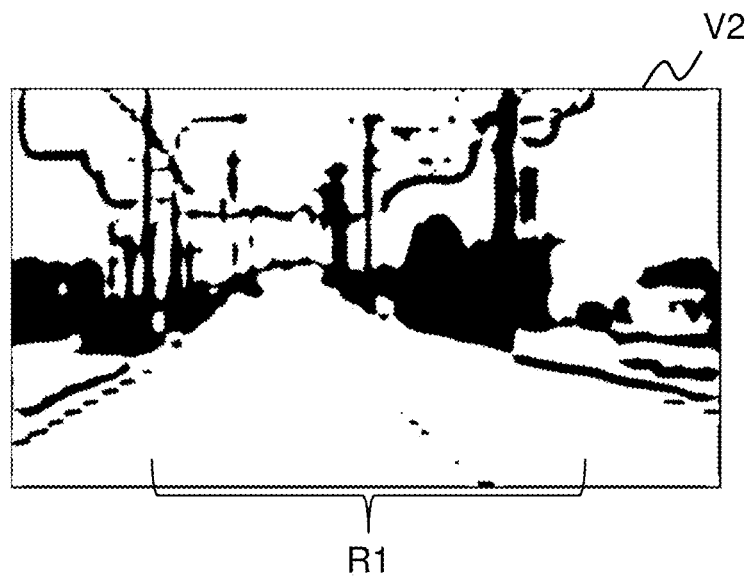

FIG. 2 is an explanatory diagram showing an example of the area recognition image. The image V1 illustrated in FIG. 2 is an example of a vehicle front image captured by the imaging device 100. For example, the area recognition image generation unit 10 may generate the area recognition image V2 including the road area R1 from the image V1. Although the area recognition image V2 illustrated in FIG. 2 is displayed in black and white binary, the area recognition image generation unit 10 may generate the area recognition image V2 using a heat map in which the areas are color-coded according to meaning, for example.

The overhead view image generation unit 20 generates an image (hereinafter referred to as a first overhead view image) obtained by converting the vehicle front image generated by the area recognition image generation unit 10 into an overhead view image (sometimes called a bird's-eye view image or top view image). The overhead view image generation unit 20 may also generate an image (hereinafter referred to as a second overhead view image) obtained by converting an image in front of the vehicle captured by the imaging device 100 into an overhead view image. Since the method of converting image to the overhead view image is widely known, a detailed explanation is omitted here.

Figure 3:
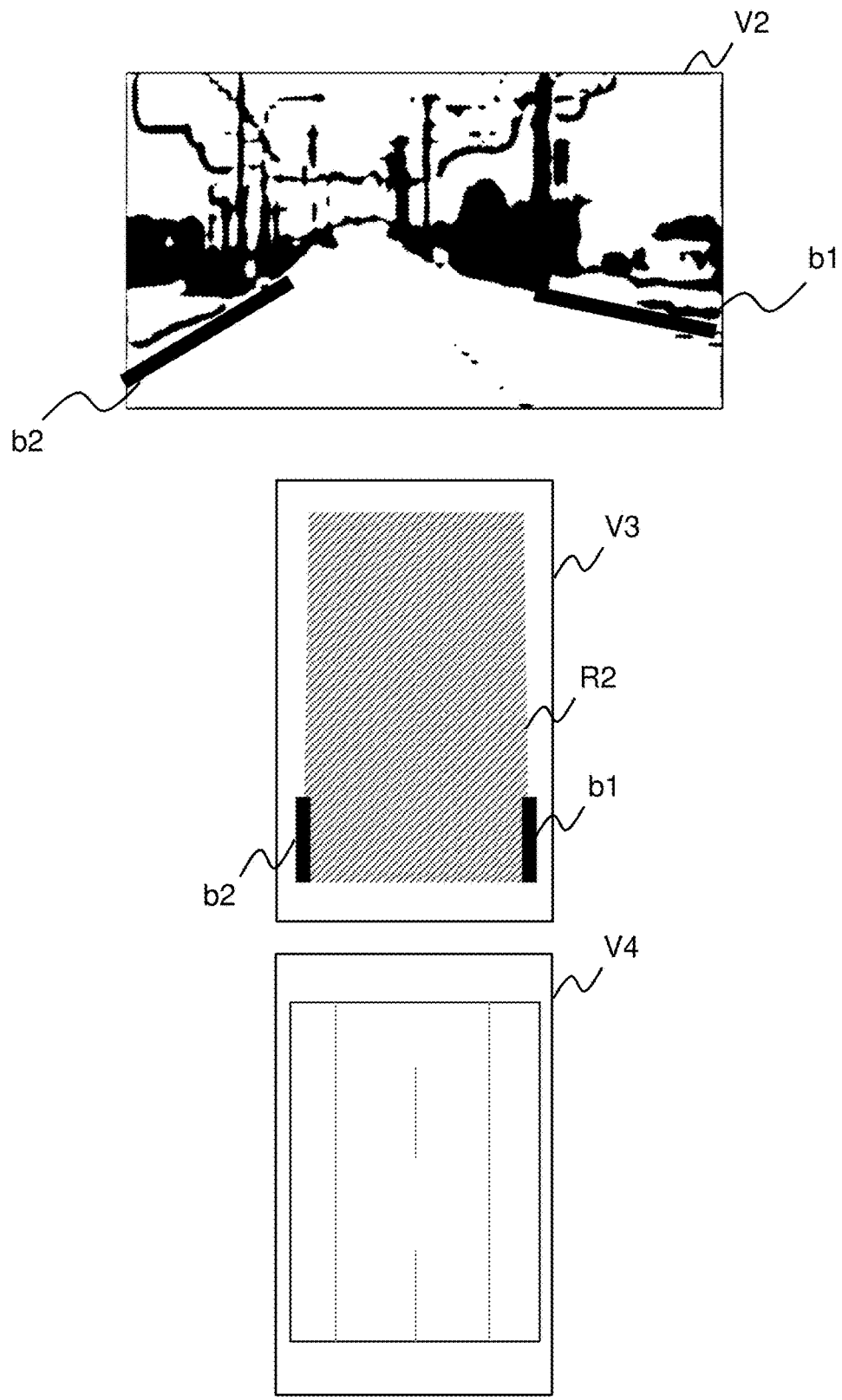
FIG. 3 It depicts an explanatory diagram showing an example of an overhead view image.

FIG. 3 is an explanatory diagram showing an example of the overhead view image. In the example shown in FIG. 3, it is indicated that the overhead view image generation unit 20 generates the first overhead view image V3 based on the area recognition image V2 generated by the area recognition image generation unit 10 and the second overhead view image V4 based on the vehicle front image V1 illustrated in FIG. 2. The shaded area R2 in the first overhead view image V3 illustrated in FIG. 3 is an area corresponding to the road area R1 illustrated in FIG. 2.

The road shape acquisition unit 30 determines the road shape from the first overhead view image. Specifically, the road shape acquisition unit 30 determines the road shape based on a shape of a boundary of the road area. For example, when the shape of the boundary is a straight line, the road shape acquisition unit 30 may determine that the road shape is straight. When the shape of the boundary is a curve, the road shape acquisition unit 30 may determine that the road shape is curved.

For example, in the example shown in FIG. 3, the road shape acquisition unit 30 may detect a boundary b1 and a boundary b2 from the first overhead view image V3 to determine the road shape.

The road shape acquisition unit 30 may also acquire road shape based on the current situation of the vehicle. The current situation of the vehicle includes the position where the vehicle is currently located and a drive state of the vehicle.

The road shape acquisition unit 30 may acquire the position where the vehicle is currently located by GPS (Global Positioning System), for example. The road shape acquisition unit 30 may then identify the acquired position from the map information prepared in advance and acquire the road shape including lane information (for example, two lanes, three lanes, etc.) from the map information corresponding to the identified position. The map information here may include lane information indicating the number of lanes on the road in addition to the road shape.

Further, the road shape acquisition unit 30 may acquire a lane form (for example, a dotted line, a long line segments, a lane color, etc.) as lane information from the map information. The drive state of the vehicle is a drive state of the vehicle operated according to the shape of the road, and is identified based on CAN (Controller Area Network) information, for example. For example, in the case of a road whose shape is curved, the road shape acquisition unit 30 may acquire a steering angle of a steering axis caused by turning the steering wheel of the vehicle to identify the shape of the road according to the acquired steering angle.

In case the line position estimation unit 40 described below does not use road shape to estimate the position of a line, the line position estimation device 1 need not include the road shape acquisition unit 30.

The line position estimation unit 40 estimates a position of line marked on a road surface from the road area identified by the generated first overhead view image, based on a principle of lane boundaries. Here, the principle of lane boundaries is a universal rule for lanes marked according to the road conditions (for example, a road shape, a road surface condition, etc.), and is predefined by the user or other parties.

The principles of lane boundary include that, for example, lane boundaries are marked in parallel, lines are marked at both ends of the road area to indicate the side strip provided for the purpose of separating it from the roadway, the lane width is designed to a predetermined width (for example, about 3.5 meters), multiple lanes (i.e., a center line and multiple traffic lane lines) are provided on a wide road, and so on.

In case multiple lanes may be provided, the line position estimation unit 40 may identify lane information (the number of lanes) from map information acquired by the road shape acquisition unit 30, and determine the number of lines based on the identified lane information. The line position estimation unit 40 itself may acquire position information and identify lane information to determine the number of lines.

The principle of lane boundaries may also be defined according to regional characteristics. Regional characteristics include, for example, narrower roads in city centers and wider roads in regional cities.

When the road shape has been acquired by the road shape acquisition unit 30, the line position estimation unit 40 may estimate the position of the line from the acquired road shape and the road area identified by the first overhead view image. For example, when the position of the line is estimated to exist in a straight line direction from the road area identified by the first overhead view image, and information that the road shape curves is acquired, the line position estimation unit 40 may estimate that the current straight line will curve at the destination.

Furthermore, when the second overhead view image is generated, the line position estimation unit 40 may estimate the position of the line from the generated second overhead view image. It should be noted that the second overhead view image is an overhead view image generated directly from the vehicle front image. Accordingly, the line position estimation unit may estimate the position of the line from the second overhead view image by a generally known method (for example, the method described in Patent Literature 1).

In this case, the position of the line is estimated from the first overhead view image and second overhead view image, respectively. Therefore, the line position estimation unit 40 may predetermine an estimation strength indicating likelihood of the line for each overhead view image and select the estimated result of the position of the line that is estimated to be more likely based on the estimation strength. The estimation strength may be adjusted according to the application used.

The vehicle position determination unit 50 identifies the position of a vehicle on the vehicle front image or overhead view image based on the estimated white line position. Specifically, the vehicle position determination unit 50 identifies whether a vehicle traveling in front of the vehicle is traveling in the lane (ego-lane) in which the vehicle is present or in another lane (for example, overtaking lane), for example.

The vehicle position determination unit 50 may display the estimated line superimposed on the vehicle front image or overhead view image, for example, and identify the position of the vehicle on the image based on a positional relationship between the displayed line and own vehicle.

Figure 4:
FIG. 4 It depicts an explanatory diagram showing an example of an output of an estimation result.

The output unit 60 outputs the result of the line position estimation. The output unit 60 may display the result of the line position estimation on the display device 200, for example. FIG. 4 is an explanatory diagram showing an example of an output of an estimation result. The image V5 illustrated in FIG. 4 shows the result of the line position estimation to be superimposed on the vehicle front image.

The area recognition image generation unit 10, the overhead view image generation unit 20, the road shape acquisition unit 30, the line position estimation unit 40, the vehicle position determination unit 50, and the output unit 60 are realized by a computer processor (for example, CPU (Central Processing Unit) or GPU (Graphics Processing Unit)) that operates according to a program (line position estimation program).

For example, a program may be stored in the memory (not shown) of the line position estimation device 1, and the processor may read the program and operate according to the program as the area recognition image generation unit 10, the overhead view image generation unit 20, the road shape acquisition unit 30, the line position estimation unit 40, the vehicle position determination unit 50 and the output unit 60. The functions of the line position estimation device 1 may be provided in a SaaS (Software as a Service) format.

Each of the area recognition image generation unit 10, the overhead view image generation unit 20, the road shape acquisition unit 30, the line position estimation unit 40, the vehicle position determination unit 50, and the output unit 60 may be realized by dedicated hardware. Some or all of the components of each device may be realized by general-purpose or dedicated circuit (circuitry), processors, etc., or a combination thereof. They may be configured by a single chip or by multiple chips connected through a bus. Some or all of the components of each device may be realized by a combination of the above-mentioned circuit, etc. and a program.

When some or all of the components of the line position estimation device 1 are realized by multiple information processing devices, circuits, etc., the multiple information processing devices, the circuit, etc. may be arranged in a centralized or distributed manner. For example, the information processing devices, circuits, etc., may be realized as a client-server system, a cloud computing system, or the like, each of which is connected through a communication network.

Figure 5:
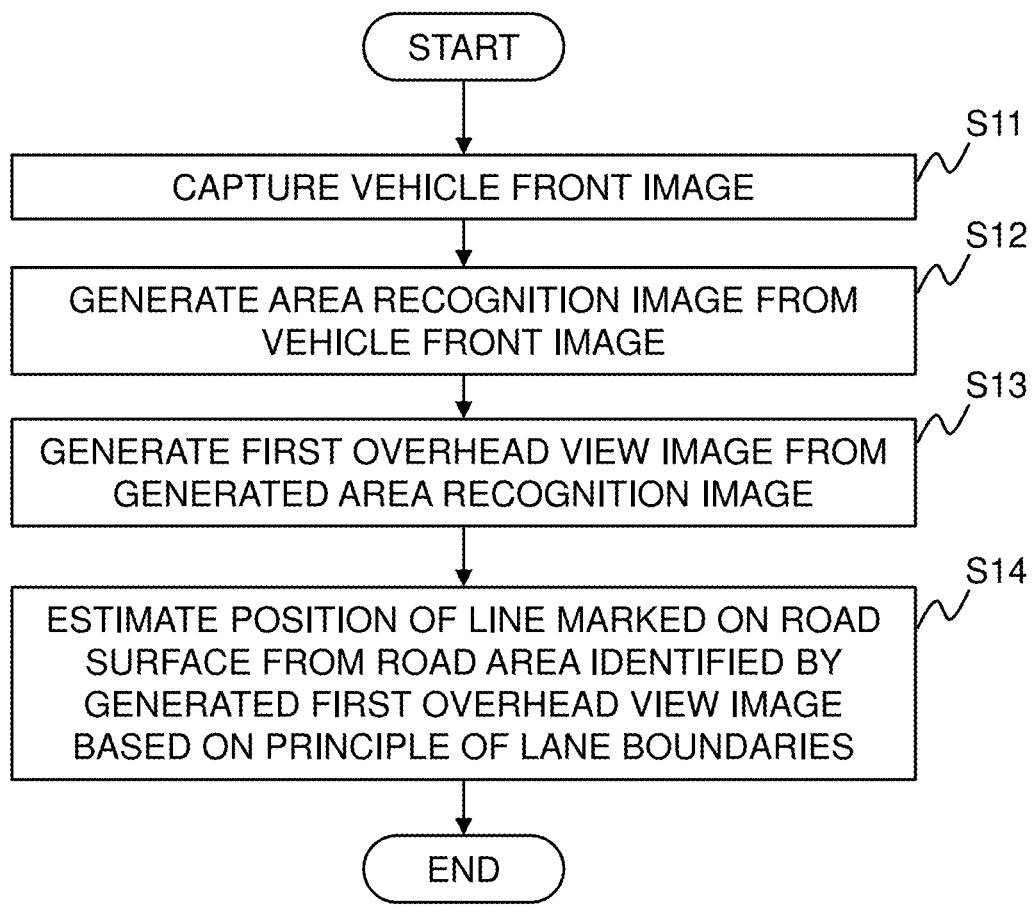
FIG. 5 It depicts a flowchart showing an example of the operation of the line position estimation device.

Next, the operation of this exemplary embodiment of line position estimation device will be explained. FIG. 5 is a flowchart showing an example of the operation of the line position estimation device.

At first, the imaging device 100 captures the vehicle front image (step S11). The area recognition image generation unit 10 generates an area recognition image from the vehicle front image (step S12). The overhead view image generation unit 20 generates a first overhead view image from the generated area recognition image (step S13). The line position estimation unit then estimates the positions of lines marked on the road surface from a road area identified by the generated first overhead view image based on a principle of lane boundaries (step S14).

When the road shape acquisition unit 30 acquires the road shape, the line position estimation unit 40 may estimate the position of a line from the acquired road shape and the identified road area. The output unit 60 may then output the estimated line positions. The vehicle position determination unit 50 may identify the position of a vehicle on the vehicle front image or the overhead view image, based on the estimated white line positions.

As described above, in this exemplary embodiment, the area recognition image generation unit 10 generates an area recognition image from the vehicle front image, and the overhead view image generation unit 20 generates a first overhead view image from the generated area recognition image. Then, the line position estimation unit 40 estimates a position of a line marked on the road surface from the road area identified by the generated first overhead view image, based on the principle of lane boundaries. Accordingly, the position of the line marked on the road surface can be properly estimated.

Figure 6:
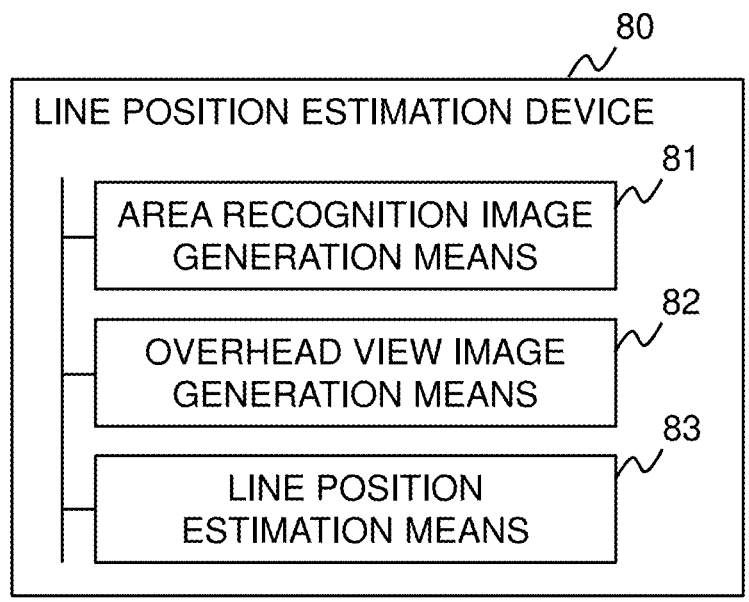
FIG. 6 It depicts a block diagram showing an overview of the line position estimation device according to the present invention.

Next, an overview of the invention will be explained. FIG. 6 is a block diagram showing an overview of the line position estimation device according to the present invention. The line position estimation device 80 (for example, the line position estimation device 1) according to the present invention includes area recognition image generation means 81 (for example, the area recognition image generation unit 10) for generating an area recognition image including a road area from a vehicle front image which is a captured image of the front of a vehicle, overhead view image generation means 82 (for example, the overhead view image generation unit 20) for generating a first overhead view image obtained by converting the generated area recognition image into an overhead view image (i.e., a top view image), and line position estimation means 83 (for example, the line position estimation unit 40) for estimating a position of line marked on a road surface from the road area identified by the generated first overhead view image, based on a principle of lane boundaries.

Such a configuration makes it possible to estimate a position of a line marked on a road surface properly.

The line position estimation device 80 may comprise road shape acquisition means (for example, the road shape acquisition unit 30) for acquiring a road shape based on a current situation of the vehicle. In addition, the line position estimation means 83 may estimate the position of line from the acquired road shape and the identified road area.

Specifically, the road shape acquisition means may acquire a position (for example, by GPS) where the vehicle is currently located, identify the acquired position from map information, and acquire the road shape including lane information from the map information corresponding to the identified position.

The road shape acquisition means may acquire the road shape based on a drive state of the vehicle (for example, CAN information) operated according to a shape of the road.

Specifically, the road shape acquisition means may acquire a steering angle of a steering axis caused by turning a steering wheel of the vehicle and identify the shape of the road according to the acquired steering angle.

The overhead view image generating means 82 may generate a second overhead view image obtained by converting the vehicle front image into an overhead view image. The line position estimation means 83 may then estimate the position of line from the generated second overhead view image, and select an estimated result of the position of line that is estimated to be more likely, based on an estimation strength which is predetermined for each overhead view image, indicating likelihood of the line.

The line position estimation device 80 may include vehicle position determination means (for example, the vehicle position determination unit 50) for identifying the position of the vehicle on the vehicle front image or the first overhead view image, based on the estimated position of line. Such a configuration makes it possible to detect the lane position of a vehicle in front of the vehicle.

Figure 7:
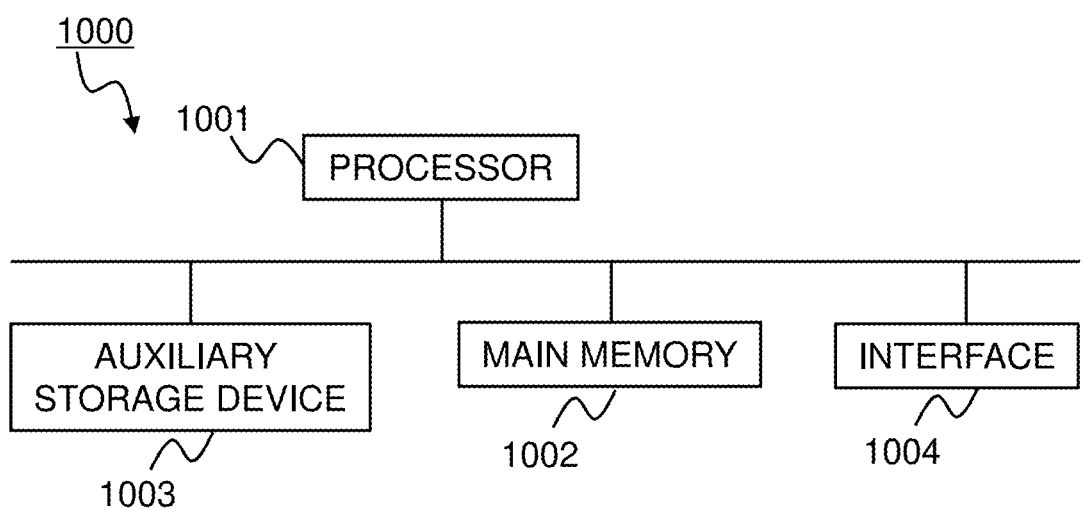
FIG. 7 It depicts a summarized block diagram showing a configuration of a computer for at least one exemplary embodiment.

FIG. 7 is a summarized block diagram showing a configuration of a computer for at least one exemplary embodiment. The computer 1000 comprises a processor 1001, a main memory 1002, an auxiliary memory 1003, and an interface 1004.

The line position estimation device 80 described above is implemented in a computer 1000. The operation of each of the above described processing parts is stored in the auxiliary storage 1003 in the form of a program (line position estimation program). The processor 1001 reads the program from the auxiliary storage 1003, develops it to the main memory 1002, and executes the above described processing according to the program.

In at least one exemplary embodiment, the auxiliary memory 1003 is an example of a non-transitory tangible medium. Other examples of a non-transitory tangible medium include a magnetic disk, an optical magnetic disk, a CD-ROM (Compact Disc Read-only memory), a DVD-ROM (Read only memory), semiconductor memory, and the like. When the program is delivered to the computer 1000 through a communication line, the computer 1000 receiving the delivery may extract the program into the main memory 1002 and execute the above processing.

The program may be a program for realizing a part of the above described functions. Further, the program may be a so-called difference file (difference program) that realizes the aforementioned functions in combination with other programs already stored in the auxiliary memory 1003.

A part of or all of the above exemplary embodiments may also be described as, but not limited to, the following supplementary notes.

(Supplementary note 1) A line position estimation device comprising:
   area recognition image generation means for generating an area recognition image including a road area from a vehicle front image which is a captured image of the front of a vehicle;
   overhead view image generation means for generating a first overhead view image obtained by converting the generated area recognition image into an overhead view image; and
   line position estimation means for estimating a position of line marked on a road surface from the road area identified by the generated first overhead view image, based on a principle of lane boundaries.

(Supplementary note 2) The line position estimation device according to Supplementary note 1, further comprising
   road shape acquisition means for acquiring a road shape based on a current situation of the vehicle, wherein
   the line position estimation means estimates the position of line from the acquired road shape and the identified road area.

(Supplementary note 3) The line position estimation device according to Supplementary note 2, wherein
   the road shape acquisition means acquires a position where the vehicle is currently located, identifies the acquired position from map information, and acquires the road shape including lane information from the map information corresponding to the identified position.

(Supplementary note 4) The line position estimation device according to Supplementary note 2 or 3, wherein
   the road shape acquisition means acquires the road shape based on a drive state of the vehicle operated according to a shape of the road.

(Supplementary note 5) The line position estimation device according to Supplementary note 4, wherein
   the road shape acquisition means acquires a steering angle of a steering axis caused by turning a steering wheel of the vehicle and identifies the shape of the road according to the acquired steering angle.

(Supplementary note 6) The line position estimation device according to any one of Supplementary notes 1 to 5, wherein
    the overhead view image generation means generates a second overhead view image obtained by converting the vehicle front image into an overhead view image, and
    the line position estimation means estimates the position of line from the generated second overhead view image, and selects an estimated result of the position of line that is estimated to be more likely, based on an estimation strength which is predetermined for each overhead view image, indicating likelihood of the line.

(Supplementary note 7) The line position estimation device according to any one of Supplementary notes 1 to 6, further comprising
    vehicle position determination means for identifying the position of the vehicle on the vehicle front image or the first overhead view image, based on the estimated position of line.

(Supplementary note 8) A line position estimation method comprising:
    generating an area recognition image including a road area from a vehicle front image which is a captured image of the front of a vehicle;
    generating a first overhead view image obtained by converting the generated area recognition image into an overhead view image; and
    estimating a position of line marked on a road surface from the road area identified by the generated first overhead view image, based on a principle of lane boundaries.

(Supplementary note 9) The line position estimation method according to Supplementary note 8, further comprising
    acquiring a road shape based on a current situation of the vehicle, wherein
    the position of line is estimated from the acquired road shape and the identified road area.

(Supplementary note 10) A program recording medium storing a line position estimation program wherein
    the line position estimation program causes a computer to execute:
    an area recognition image generation process of generating an area recognition image including a road area from a vehicle front image which is a captured image of the front of a vehicle;
    an overhead view image generation process of generating a first overhead view image obtained by converting the generated area recognition image into an overhead view image; and
    a line position estimation process of estimating a position of line marked on a road surface from the road area identified by the generated first overhead view image, based on a principle of lane boundaries.

(Supplementary note 11) The program recording medium according to Supplementary note 10, wherein
    the line position estimation program further causes the computer to execute a road shape acquisition process of acquiring a road shape based on a current situation of the vehicle, and
    in the line position estimation process, the line position estimation program causes the computer to execute estimating the position of line from the acquired road shape and the identified road area.

(Supplementary note 12) A program recording medium storing a line position estimation program wherein
    the line position estimation program causes a computer to execute:
    an area recognition image generation process of generating an area recognition image including a road area from a vehicle front image which is a captured image of the front of a vehicle;
    an overhead view image generation process of generating a first overhead view image obtained by converting the generated area recognition image into an overhead view image; and
    a line position estimation process of estimating a position of line marked on a road surface from the road area identified by the generated first overhead view image, based on a principle of lane boundaries.

(Supplementary note 13) The program recording medium according to Supplementary note 12, wherein
    the line position estimation program further causes the computer to execute a road shape acquisition process of acquiring a road shape based on a current situation of the vehicle, and
    in the line position estimation process, the line position estimation program causes the computer to execute estimating the position of line from the acquired road shape and the identified road area.

Although the invention of the present application has been described above with reference to exemplary embodiments, the present invention is not limited to the above exemplary embodiments. Various changes can be made to the configuration and details of the present invention that can be understood by those skilled in the art within the scope of the present invention.

REFERENCE SIGNS LIST

1 Line position estimation device
10 Area recognition image generation unit
20 Overhead view image generation unit
30 Road shape acquisition unit
40 Line position estimation unit
50 Vehicle position determination unit
60 Output unit
100 Imaging device
200 Display device

What is claimed is:
1. A line position estimation device comprising:
    a memory storing instructions; and
    one or more processors configured to execute the instructions to:
    generate an area recognition image including a road area from a vehicle front image which is a captured image of the front of a vehicle;
    generate a first overhead view image obtained by converting the generated area recognition image into an overhead view image; and
    estimate a position of line marked on a road surface from the road area identified by the generated first overhead view image, based on a rule indicating that lanes are marked according to a road shape, or a rule indicating that lane boundaries are marked in parallel.

2. The line position estimation device according to claim 1, wherein the processor is configured to execute the instructions to:
    acquire the road shape based on a current situation of the vehicle; and
    estimate the position of line from the acquired road shape and the identified road area.

3. The line position estimation device according to claim 2, wherein the processor is configured to execute the instructions to acquire a position where the vehicle is currently located, identify the acquired position from map information, and acquire the road shape including lane information from the map information corresponding to the identified position.

4. The line position estimation device according to claim 2, wherein the processor is configured to execute the instructions to acquire the road shape based on a drive state of the vehicle operated according to a shape of the road.

5. The line position estimation device according to claim 4, wherein the processor is configured to execute the instructions to acquire a steering angle of a steering axis caused by turning a steering wheel of the vehicle and identify the shape of the road according to the acquired steering angle.

6. The line position estimation device according to claim 1, wherein the processor is configured to execute the instructions to:
   generate a second overhead view image obtained by converting the vehicle front image into an overhead view image, and
   estimate the position of line from the generated second overhead view image, and select an estimated result of the position of line that is estimated to be more likely, based on an estimation strength which is predetermined for each overhead view image, indicating likelihood of the line.

7. The line position estimation device according to claim 1, wherein the processor is configured to execute the instructions to identify the position of the vehicle on the vehicle front image or the first overhead view image, based on the estimated position of line.

8. A line position estimation method performed by a computer and comprising:
   generating an area recognition image including a road area from a vehicle front image which is a captured image of the front of a vehicle;
   generating a first overhead view image obtained by converting the generated area recognition image into an overhead view image; and
   estimating a position of line marked on a road surface from the road area identified by the generated first overhead view image, based on a rule indicating that lanes are marked according to a road shape, or a rule indicating that lane boundaries are marked in parallel.

9. The line position estimation method according to claim 8, further comprising
   acquiring the road shape based on a current situation of the vehicle, wherein
   the position of line is estimated from the acquired road shape and the identified road area.

10. A non-transitory computer readable information recording medium storing a line position estimation program executable by a processor to perform a method comprising:
    generating an area recognition image including a road area from a vehicle front image which is a captured image of the front of a vehicle;
    generating a first overhead view image obtained by converting the generated area recognition image into an overhead view image; and
    estimating a position of line marked on a road surface from the road area identified by the generated first overhead view image, based on a principle of lane boundaries based on a rule indicating that lanes are marked according to a road shape, or a rule indicating that lane boundaries are marked in parallel.

11. The non-transitory computer readable information recording medium according to claim 10, further comprising
    acquiring a road shape based on a current situation of the vehicle, wherein the position of line is estimated from the acquired road shape and the identified road area.

12. The line position estimation device according to claim 1, wherein the rule is a rule for road width defined according to regional characteristics.

13. The line position estimation device according to claim 1, wherein the rule is a rule indicating that multiple lanes are provided according to width.

* * * * *